(12) United States Patent
D'Alessandro

(10) Patent No.: US 6,370,808 B1
(45) Date of Patent: Apr. 16, 2002

(54) FLIPPIN FISHING METHOD AND ROD EMPLOYING TANGLE PREVENTING LINE GUIDE

(76) Inventor: David A. D'Alessandro, 5 Franklin St., Manchester, CT (US) 06040

( * ) Notice: Subject to any disclaimer, the term of this patent is extended or adjusted under 35 U.S.C. 154(b) by 0 days.

(21) Appl. No.: 09/726,754

(22) Filed: Nov. 30, 2000

Related U.S. Application Data

(63) Continuation of application No. 09/420,984, filed on Oct. 20, 1999, now abandoned.

(51) Int. Cl.$^7$ .............................................. A01K 79/00
(52) U.S. Cl. ......................................................... 43/4.5
(58) Field of Search .................................. 43/18.1, 4.5

(56) References Cited

U.S. PATENT DOCUMENTS

| | | | | |
|---|---|---|---|---|
| 564,742 | A | * | 7/1896 | Dunn .......................... 43/18.1 |
| 813,492 | A | * | 2/1906 | Fischer ....................... 43/18.1 |
| 1,643,003 | A | * | 9/1927 | Chromczak ................. 43/18.1 |
| 1,914,500 | A | * | 6/1933 | Groschup .................... 43/18.1 |
| 2,597,738 | A | * | 5/1952 | Koos .......................... 43/18.1 |
| 2,874,507 | A | * | 2/1959 | Faber et al. ................. 43/18.1 |
| 2,908,102 | A | * | 10/1959 | Meulnart ..................... 43/18.1 |
| 3,791,063 | A | * | 2/1974 | Harker .......................... 43/4.5 |
| 3,927,486 | A | * | 12/1975 | Yuen .............................. 43/20 |
| 3,975,855 | A | * | 8/1976 | McKeown ...................... 43/23 |
| 4,648,194 | A | * | 3/1987 | Carroll, Jr. ..................... 43/4.5 |
| 4,653,212 | A | * | 3/1987 | Pixoton ......................... 43/4.5 |
| 4,841,662 | A | * | 6/1989 | Zettervall et al. ............ 43/25.2 |
| 5,207,013 | A | * | 5/1993 | Bartok et al. .................. 43/4.5 |
| 5,259,140 | A | * | 11/1993 | Epperson ..................... 43/18.1 |
| 5,444,934 | A | * | 8/1995 | LaTouche .................... 43/18.1 |
| 5,864,980 | A | * | 2/1999 | Lai ............................. 43/18.1 |
| 5,894,692 | A | * | 4/1999 | Firmin .......................... 43/4.5 |

FOREIGN PATENT DOCUMENTS

| | | | | |
|---|---|---|---|---|
| CH | 122104 | B1 | * | 6/1948 | ................. 43/18.1 |
| EP | 85792 | B1 | * | 8/1983 | |
| FR | 1171106 | B1 | * | 1/1959 | ................. 43/19.1 |
| FR | 1565620 | B1 | * | 5/1969 | ................. 43/18.1 |
| FR | 2473844 | B1 | * | 7/1981 | |
| FR | 2563694 | B1 | * | 11/1985 | |
| FR | 2599590 | B1 | * | 12/1987 | |
| GB | 684671 | B1 | * | 12/1952 | ................. 43/18.1 |
| GB | 815758 | B1 | * | 7/1959 | ................. 43/18.1 |
| GB | 2247143 | B1 | * | 2/1992 | ................. 43/18.1 |
| JP | 406113702 | B1 | * | 4/1994 | |
| SU | 1181607 | B1 | * | 9/1985 | ................. 43/18.1 |

OTHER PUBLICATIONS

Circle, Homer. Bass Wisdom. New York, NY: The Lyons Press. 2000, pp. 153 and 184–191.*

Kugach, Gene. Freshwater Fishing Tips & Techniques. Mechanicsburg, PA: Stackpole Books. 1997, p. 87.*

(List continued on next page.)

Primary Examiner—Darren W. Ark
(74) Attorney, Agent, or Firm—M. P. Williams

(57) ABSTRACT

In a method of fishing utilizing the flippin technique, a loop of line is drawn from between two eyelets, rather than from between the reel and an eyelet. A flippin rod (10a, 10b) has an additional eyelet (27) mounted between the reel (13) and the closest guide (19) of a plurality of conventional eyelet fishing guides (16–19). Fishing utilizing the flippin technique with the rod (10a, 10b) includes grasping the line (21) between the guides (19, 27) and pulling the line into a loop (29). The eyelet (27) prevents the loop (29) from tangling with the reel (13) when the loop is released, and also provides additional line (31) so the bait will achieve a deeper depth. In a telescoping rod (11b), the eyelet (27) is positioned so as not to interfere with retracting the distal portion (34) of the rod (11b) into the proximal portion (33).

8 Claims, 3 Drawing Sheets

OTHER PUBLICATIONS

Dance, Bill and Tucker, Tim. Bill Dance on Largemouth Bass. Micanopy, FL: Tim Tucker Outdoor Productions Corp. 1996, pp. 69–72.*

The Ultimate Bass Fishing Resource Guide, (1997), Flipping and Pitching, Available web site: www.bassresource.com/html/flip&pitch.html, Accessed on: May 31, 2000.*

Tucker, Tim, (1998), Flipping/Pitching Secrets, Tactical Sessions Jan. 2000, Available web site: www.timtucker.probass.com/archives/tactessmay99.phtml, Last Update: Jan. 7, 2000, Accessed on: May 31, 2000.*

* cited by examiner

FLIPPIN FISHING METHOD AND ROD EMPLOYING TANGLE PREVENTING LINE GUIDE

RELATED APPLICATION

This application is a continuation of application Ser. No. 09/420,984, filed Oct. 20, 1999 now abandoned.

TECHNICAL FIELD

This invention relates to a method of fishing employing an improvement to the known flippin technique wherein line is drawn from between two line guides, and to a flippin pole having an additional line guide fairly close to the reel so as to prevent open loops of line pulled out by hand from tangling with the reel when the line is allowed to return to the pole, and to provide a longer length of working line in the loop.

BACKGROUND ART

Traditional spinning reels and casting reels utilize fishing line which has memory, resulting in the line, when outside of the reel, looping into spirals. When the spirals are larger than the eyelet line guides through which the line, with a hooked bait or other device secured to the end thereof, must pass as the line is cast outwardly away from the pole, the line drags on the line guides, thus significantly reducing the length of the cast. In fact, it has been known to move the line guide closest to the reel one or two inches further away from the reel so as to reduce drag and permit an acceptable length of cast. The size of the spiral loops in the line decreases with distance away from the reel, and therefore, conventional spinning and casting rods have the line guides disposed so that the line guide closest to the reel is a significant fraction of the pole length away from the reel, typically being between 18 inches and 30 inches away from the reel on poles on the order of 5 feet to 8 feet.

To save additional time when in shallow water, the flippin technique was developed about a decade ago to avoid reeling in the bait and recasting it, in order to tease a fish, or to fish successive spots. This is the most effective way to catch fish in heavy weeds or other cover, or in dirty water. Instead, with a length of line extending outwardly from the tip of the pole, and the reel in a line braking mode, the angler pulls an open loop of line away from the rod as shown in FIG. 1, and then either releases the loop of line or guides it back to the pole so as to allow the bait to lower in an area of water to be fished. When it is desired to raise the bait or remove the bait from that area of water, either to reinsert it in the same area or to move it to another area, the angler grabs the line and again pulls an open loop of line away from the pole. The angler also moves the tip of the pole up as he pulls a loop of line, and moves the tip of the pole down as he releases the loop of line. The pole is held in one of the angler's hands, and the other hand is used to reel-in a fish after a strike; the other hand, on the same side of the pole as the reel crank, is usually also used to pull the loop of line when flippin. The loop of line is therefore usually on the same side of the pole as the reel crank. Therefore, when the line is released, the line tends to tangle around the reel. It is difficult if not impossible to allow the bait to drop as quickly as desired while at the same time guiding the line so as to prevent it from tangling with the reel. In fact, it is common knowledge that the only problem with the flippin technique is the tendency to get the line tangled with the reel, which would cause the angler to loose the fish. When fishing in a bass tournament, anglers tend to cover successive spots of the area being fished very quickly, thereby exacerbating the problem. So as not to startle the target fish when flippin, it is desirable to be as far away from the target fish as possible; therefore, flippin poles (sometimes called "flippin sticks") are heavy (strong) and usually 7½ or 8 feet long. They are also used in a technique called "pitching", in which the bait is positioned by an underhand cast, for a gentle, accurate presentation; therefore, such rods are sometimes called "flippin/pitching" rods.

DISCLOSURE OF INVENTION

Objects of the invention include fishing using the flippin technique without line becoming entangled with a reel; and a flippin pole, the line of which does not become entangled with the reel.

This invention is predicated on the discoveries that the open loop of line formed when fishing with a flippin pole must be kept away from the reel; that an eyelet within a few inches of the reel will keep line, in the loop of line released when fishing with the flippin technique, away from the reel of a flippin pole; and that an eyelet which is fairly close to the reel on the rod of a flippin pole does not impede fishing since the length of the cast is not involved when using a flippin pole.

In accordance with the invention, a method of fishing utilizing the flippin technique comprises pulling a length of line from between two line guides closest to the reel, into a loop away from the pole, and then allowing the loop of line to return to the pole as the bait is lowered in the water.

According to the invention, a flippin pole having a plurality of conventional line guides disposed along the pole near a distal end thereof has an additional line guide disposed on the pole near the reel. A method of fishing utilizing an improvement in the flippin technique comprises pulling a length of line, from between the additional line guide and the one of said conventional line guides closest to said reel, into a loop, and allowing the loop of line to return to the pole, the additional line guide preventing the line from tangling with the reel as it returns to the pole. According to the invention further, a conventional telescoping flippin rod is provided with an additional line guide disposed on the distal end of the proximal portion of the rod so that the additional line guide does not interfere with the retraction of the distal portion of the rod into the proximal portion.

The invention not only avoids tangling of the line with the reel, but it also provides an additional length of line for fishing, substantially equal to twice the distance between the additional line guide and the reel.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
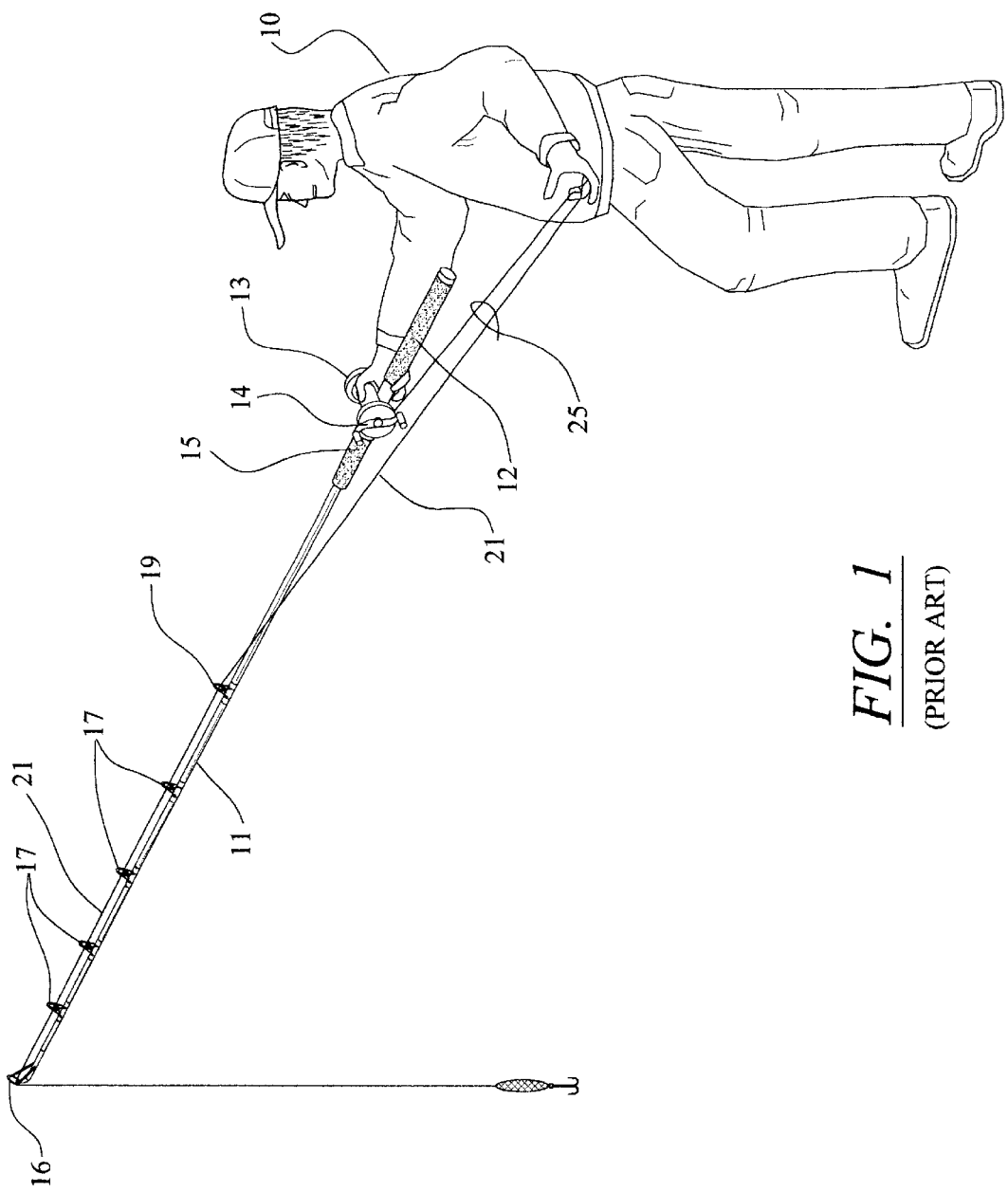
FIG. 1 is a perspective view of an angler utilizing a flippin rod according to the prior art.

Referring to FIG. 1, an angler 10 is holding a flippin pole or rod 11 in his right hand by a handle 12 at a proximal end of the rod, in the vicinity of a reel 13, with a crank 14, disposed on a reel seat 15. The rod has conventional eyelet line guides 16, 17, 19 to guide the line 21 therewithin. A bait 22, which may typically be a jig, a flippin tube, a tube, a worm, or a plastic crawfish, with or without rattles, is fastened to the end of the line. The angler may initially put the reel into a line-releasing mode, to let out an amount of line to "flip" with, the line extending outwardly beyond the tip of the pole (beyond the line guide 16). Then the reel is put into a line braking mode. With his left hand, the angler has pulled a length of line 21 into an open loop 25, the line having been pulled from between the reel 13 and the guide 19 which is closest to the reel 13, as shown in FIG. 1. The length of line in the loop 25 defines the maximum distance that the bait 22 can be below the guide 16 when in the water to be fished. To achieve the loop 25, the angler reaches close to the pole, catches the line 21 at some point between the reel 13 and the eyelet 19, and then pulls the loop 25 either to the maximal point that is comfortable for him, or to a lesser point depending upon the desired movement of the bait. After the bait 22 has been released into the water to be fished, the angler will again pull the line into the loop 25, so as to raise the bait, either to tease the fish or to move the bait from one area of water to be fished to another area of water to be fished. Each time that the loop 25 of line is released, there is a high likelihood that it will become tangled with the reel 13 or the crank 14. The foregoing description of FIG. 1 represents a conventional flippin pole and the conventional flippin technique of fishing.

Figure 2:
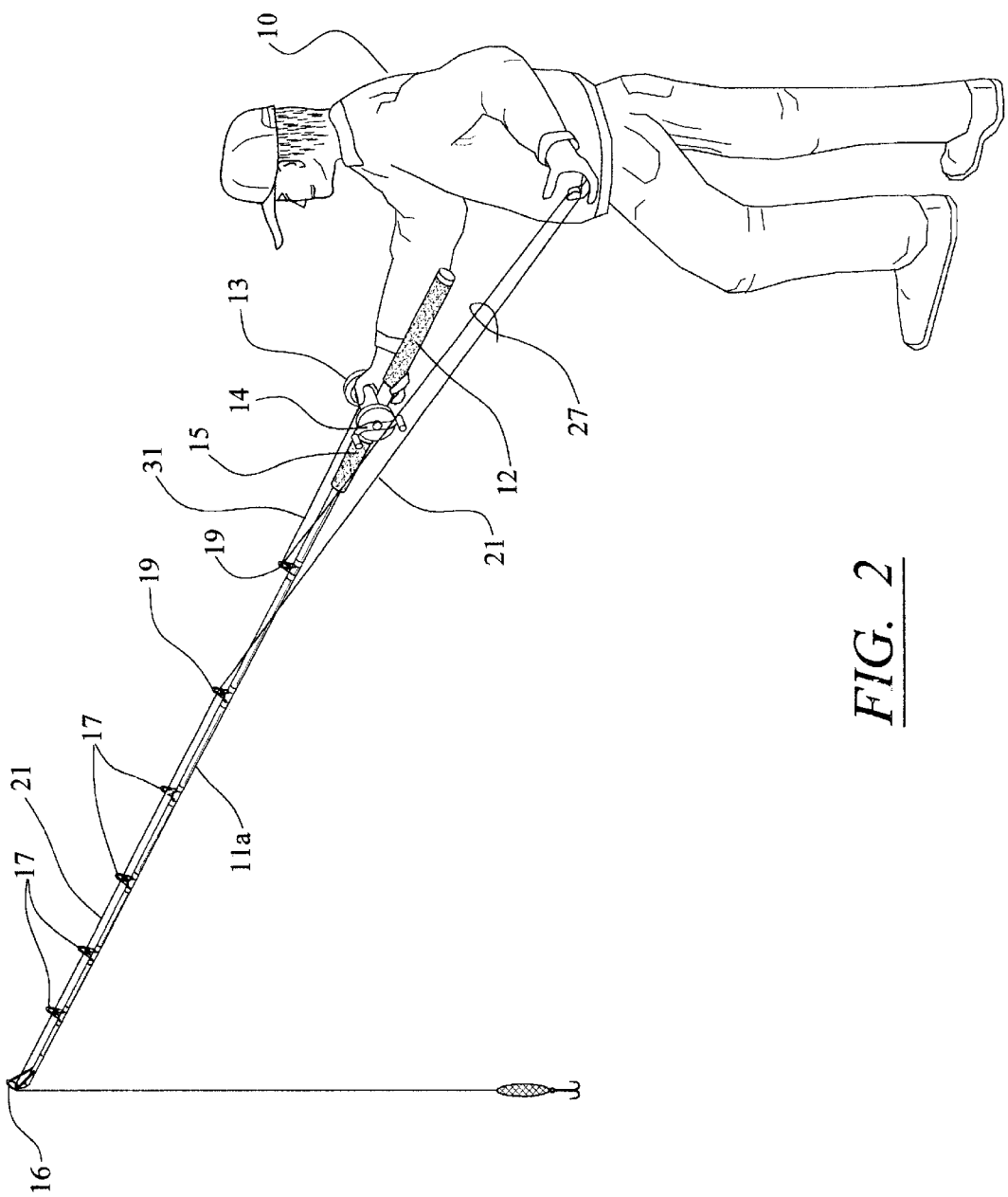
FIG. 2 is a perspective view of an angler practicing a flippin method according to the present invention utilizing a flippin rod according to the present invention.

Referring to FIG. 2, a flippin pole 11a in accordance with the invention has an additional eyelet line guide 27 disposed near the reel 13. The additional line guide 27 is positioned between the reel 13 and the line guide 19, which is the closest conventional line guide to the reel, at a point which is sufficiently distant from the reel 13 so that line pulled into a loop 29 from between the line guides 19 and 27 will not get tangled with the reel 13 or the handle 14 when the line is released (or otherwise allowed to return adjacent to the pole), but sufficiently close to the reel 13 so that the line between the line guides 19 and 27 is easily reached by the hand of the angler 10. When fishing with the pole of FIG. 2, employing the flippin technique according to the present invention, the angler 10 will grasp a length of line between the line guides 19 and 27 to form an open loop 29, as shown in FIG. 2. In a typical flippin rod according to the invention, the distance of the additional line guide 27 from the reel 13 may preferably be between about two inches and about fifteen inches.

Because the line does not have to return to the mouth of the reel 13 when the loop 29 is released or otherwise returns close to the pole, the distance that the line in the loop 29 can be kept away from the reel 13 is governed by the position of the angler's hand as he releases the loop. Since the loop 29 is generally not immediately adjacent to the reel 23, it will not become entangled with the reel 13 or the crank 14 when it returns to the pole.

The amount of line in a loop 29 made with the invention will also increase by substantially twice the distance between the line guide 27 and the reel 13: This provides additional movement of the bait 22 when using the flippin method of the invention.

Figure 3:
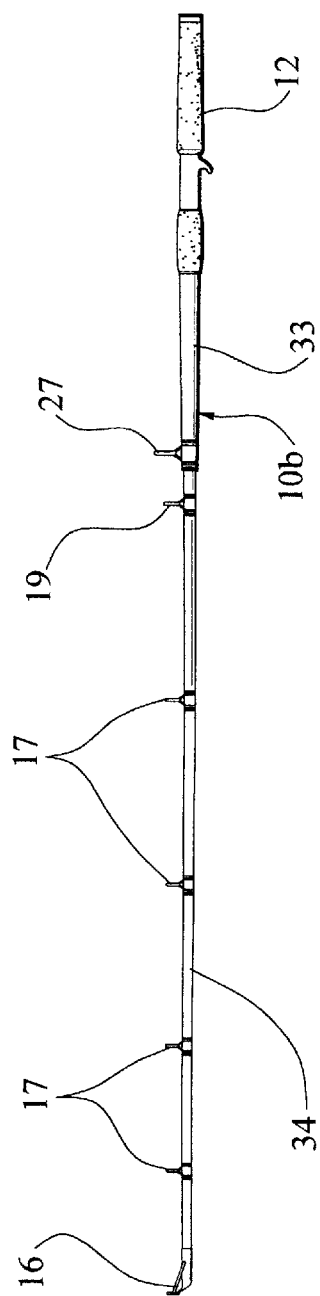
FIG. 3 is a side elevation view of a telescoping flippin rod according to the present invention when in its extended condition for fishing.
Figure 4:
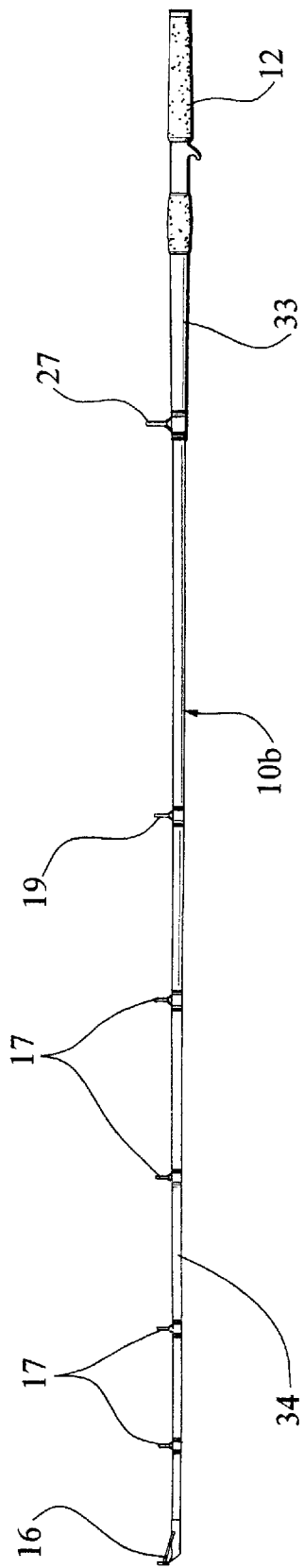
FIG. 4 is a side elevation view of a telescoping flippin rod according to the present invention when in its retracted condition for transport or storage.

If the flippin rod is a telescoping rod 11b as illustrated in FIG. 3, then the additional line guide 27 may be mounted on the distal end of the proximal portion 33, which conventionally comprises a reel seat, without interfering with the retraction of the distal portion 34 of the rod 11b into the proximal portion 33 of the rod, as illustrated in FIG. 4.

If the flippin rod is an interline rod, the plurality of conventional line guides include the entrance guide and the hollow portion of the shaft through which the line passes. The invention may be used with other long, heavy fishing rods (such as an 8 foot salt water rod) when it is used as a flippin rod.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A method of fishing using a flippin technique comprising:
   (a) holding a flippin pole having a rod, a reel with line disposed near a proximal end of said rod for dispensing the line, and a plurality of line guides disposed along said rod, said line extending from said reel through said guides outwardly beyond a distal end of said rod and having a bait fastened to a distal end of said line;
   (b) setting said reel into a line-braking mode;
   (c) with said reel in the line-braking mode, using a hand to draw said line from between a pair of said line guides into an open loop of line; and
   (d) then releasing said open loop of line, thereby lowering said bait in a first area of water to be fished.

2. A method according to claim 1 wherein:
said step (c) comprises drawing said line from between a pair of line guides which are the closest line guides to said reel.

3. A method according to claim 1 further comprising:
   (e) with said reel still set in said line-braking mode, using the hand to pull a length of said line from between said pair of line guides, to form another open loop of line, thereby raising said bait; and
   (f) repeating step (d).

4. A method according to claim 3 further comprising:
between said steps (e) and (d), moving a tip of said pole so as to lower said bait in a second area of water different from said first area of water to be fished.

5. A method according to claim 3 wherein:
said step (e) comprises pulling a length of said line which is smaller than a length of said line drawn in said step (c).

6. A method according to claim 3 wherein:
a tip of said pole is lowered concurrently with said step (d) and the tip of said pole is raised concurrently with said step (e).

7. A method of fishing using a flippin technique, comprising:
   (a) holding a rod having a reel seat disposed near a proximal end of said rod, a reel with line, for dispensing the line, disposed on said reel seat, a plurality of conventional line guides disposed along a length of said rod near a distal end of said rod, an additional line guide disposed between said reel and one of said conventional line guides that is the closest of said conventional line guides to said reel, at a point far enough from said reel so that line drawn from between said one conventional line guide and said additional line guide into an open loop of line away from said rod, will not get tangled with said reel when allowed to return to said rod, but close enough to said proximal end to be easily reached by an angler using said rod, said line extending from said reel through said line guides outwardly beyond the distal end of said rod and having a bait fastened to a distal end of said line;

(b) setting said reel into a line-braking mode;

(c) with said reel in the line-braking mode, using a hand to draw said line from between said one conventional line guide and said additional line guide into said open loop of line; and (d) releasing said open loop of line, thereby lowering said bait in an area of water to be fished.

8. A method of fishing using a flippin technique, comprising:

(a) holding a telescoping rod having a distal portion which retracts within a proximal portion of said rod for transport and storage, a reel seat disposed on said proximal portion, a reel with line, for dispensing the line, disposed on said reel seat, a plurality of conventional line guides disposed along a length of said distal portion, one of said conventional line guides being the closest of said conventional line guides to said reel, and an additional line guide disposed on said proximal portion near a distal end of said proximal portion so as to not interfere with the retraction of said distal portion into said proximal portion, said line extending from said reel through said line guides outwardly beyond a distal end of said rod and having a bait fastened to a distal end of said line;

(b) setting said reel into a line-braking mode;

(c) with said reel in the line-braking mode, using a hand to draw said line from between said one conventional line guide and said additional line guide into an open loop of line; and (d) releasing said open loop of line, thereby lowering said bait in an area of water to be fished.

\* \* \* \* \*